(12) United States Patent
Diop et al.

(10) Patent No.: US 10,693,269 B2
(45) Date of Patent: Jun. 23, 2020

(54) SPLICE ASSEMBLY

(71) Applicant: Hubbell Incorporated, Shelton, CT (US)

(72) Inventors: Seydou Diop, Birmingham, AL (US); Adrian Beau Candelaria, Alabaster, AL (US)

(73) Assignee: Hubbell Incorporated, Shelton, CT (US)

( * ) Notice: Subject to any disclaimer, the term of this patent is extended or adjusted under 35 U.S.C. 154(b) by 302 days.

(21) Appl. No.: 15/634,635

(22) Filed: Jun. 27, 2017

(65) Prior Publication Data
US 2017/0373452 A1    Dec. 28, 2017

Related U.S. Application Data

(60) Provisional application No. 62/355,741, filed on Jun. 28, 2016.

(51) Int. Cl.
| | | |
|---|---|---|
| *B23P 19/00* | (2006.01) | |
| *H05K 13/04* | (2006.01) | |
| *H01R 43/00* | (2006.01) | |
| *H01R 11/09* | (2006.01) | |
| *H01R 4/52* | (2006.01) | |
| *H02G 15/18* | (2006.01) | |
| *H01R 4/10* | (2006.01) | |
| *H02G 15/007* | (2006.01) | |

(52) U.S. Cl.
CPC ............ *H01R 43/002* (2013.01); *H01R 4/10* (2013.01); *H01R 4/52* (2013.01); *H01R 11/09* (2013.01); *H02G 15/18* (2013.01); *H02G 15/007* (2013.01)

(58) Field of Classification Search
CPC .......... H01R 43/002; H01R 4/10; H01R 4/52; H01R 11/09; H02G 15/18; H02G 15/007
See application file for complete search history.

(56) References Cited

U.S. PATENT DOCUMENTS

| | | | |
|---|---|---|---|
| 2,738,840 A | 3/1956 | Hubbard | |
| 2,867,787 A | 1/1959 | Nilsson | |
| 3,487,160 A | 12/1969 | Johnsen | |
| 3,845,235 A * | 10/1974 | Bahder | ............... H02G 15/184 174/73.1 |
| 4,292,732 A | 10/1981 | Tucci | |
| 5,278,353 A * | 1/1994 | Buchholz | ............... H01R 4/52 174/84 R |

(Continued)

OTHER PUBLICATIONS

PCT/US2017/039509 International Search Report and Written Opinion dated Sep. 11, 2017 (14 pages)

*Primary Examiner* — Paul D Kim
(74) *Attorney, Agent, or Firm* — Michael Best & Friedrich, LLP

(57) ABSTRACT

A splice assembly for engaging a conductor includes a brush configured to engage the conductor. The brush includes a housing having a first portion and a second portion. The housing defines a housing axis extending between the first portion and the second portion. The first portion defines a cavity having an open end. The second portion defines a bore. A diameter of the cavity is larger than a diameter of the bore. The cavity and the bore are configured to receive the conductor therethrough. The brush further includes a brush member secured within the cavity and positioned proximate the open end.

15 Claims, 6 Drawing Sheets

(56) References Cited

U.S. PATENT DOCUMENTS

| | | | |
|---|---|---|---|
| 5,369,849 A | 12/1994 | De France | |
| 5,547,404 A | 8/1996 | Nellis, Jr. et al. | |
| 7,160,142 B2 | 1/2007 | Hughes et al. | |
| 8,069,521 B2 | 12/2011 | Beck et al. | |
| 8,512,070 B2 | 8/2013 | De France | |
| 8,727,819 B2 | 5/2014 | Giefers et al. | |
| 9,490,577 B2* | 11/2016 | Diop | H01R 13/641 |
| 9,537,297 B2* | 1/2017 | Cawood | H02G 15/18 |
| 9,812,794 B2 | 11/2017 | De France | |
| 9,948,083 B2* | 4/2018 | Cawood | H02G 15/18 |
| 2012/0217062 A1* | 8/2012 | Cawood | H01R 4/52 |
| | | | 174/84 R |
| 2015/0107875 A1 | 4/2015 | Diop et al. | |

\* cited by examiner

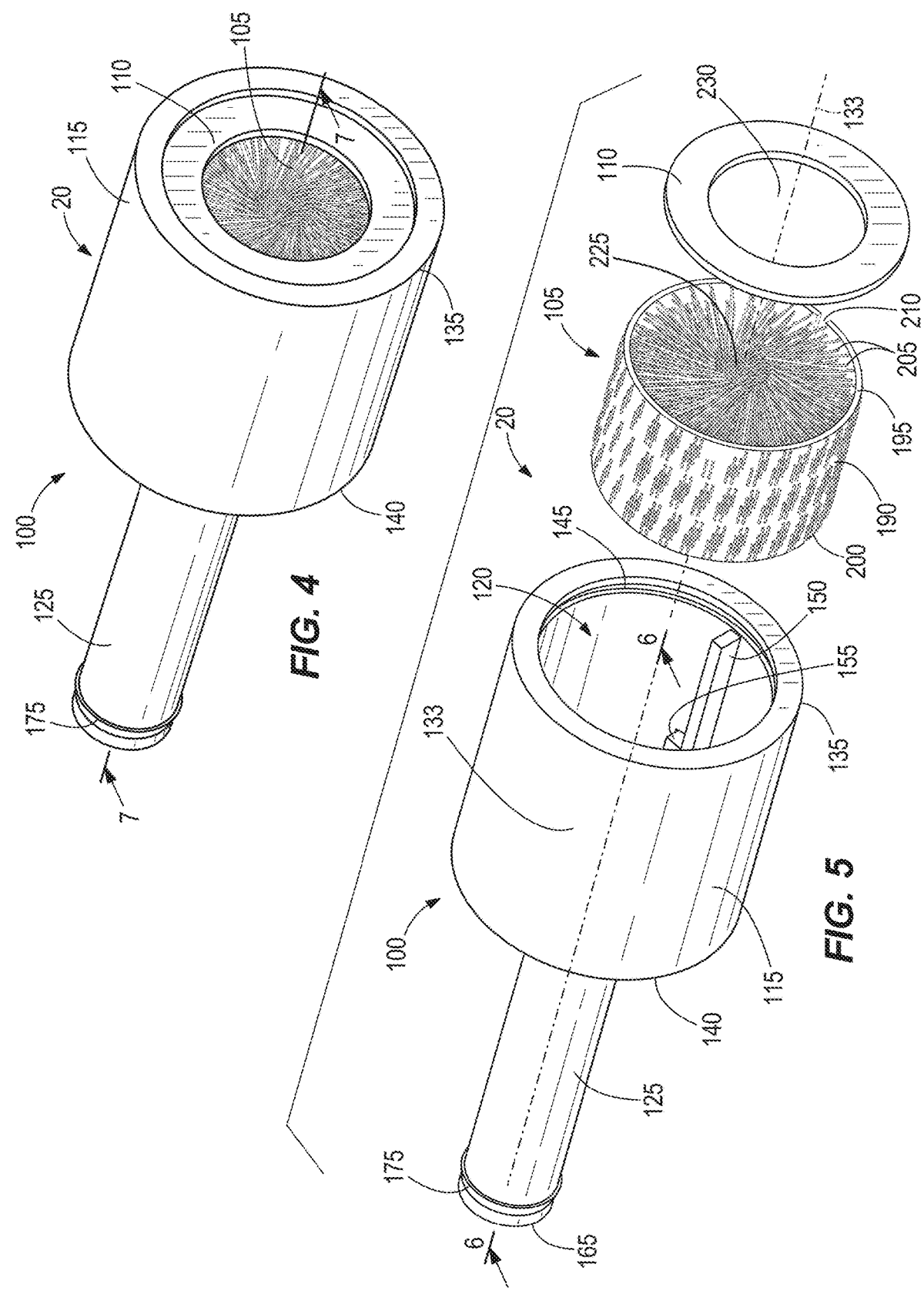

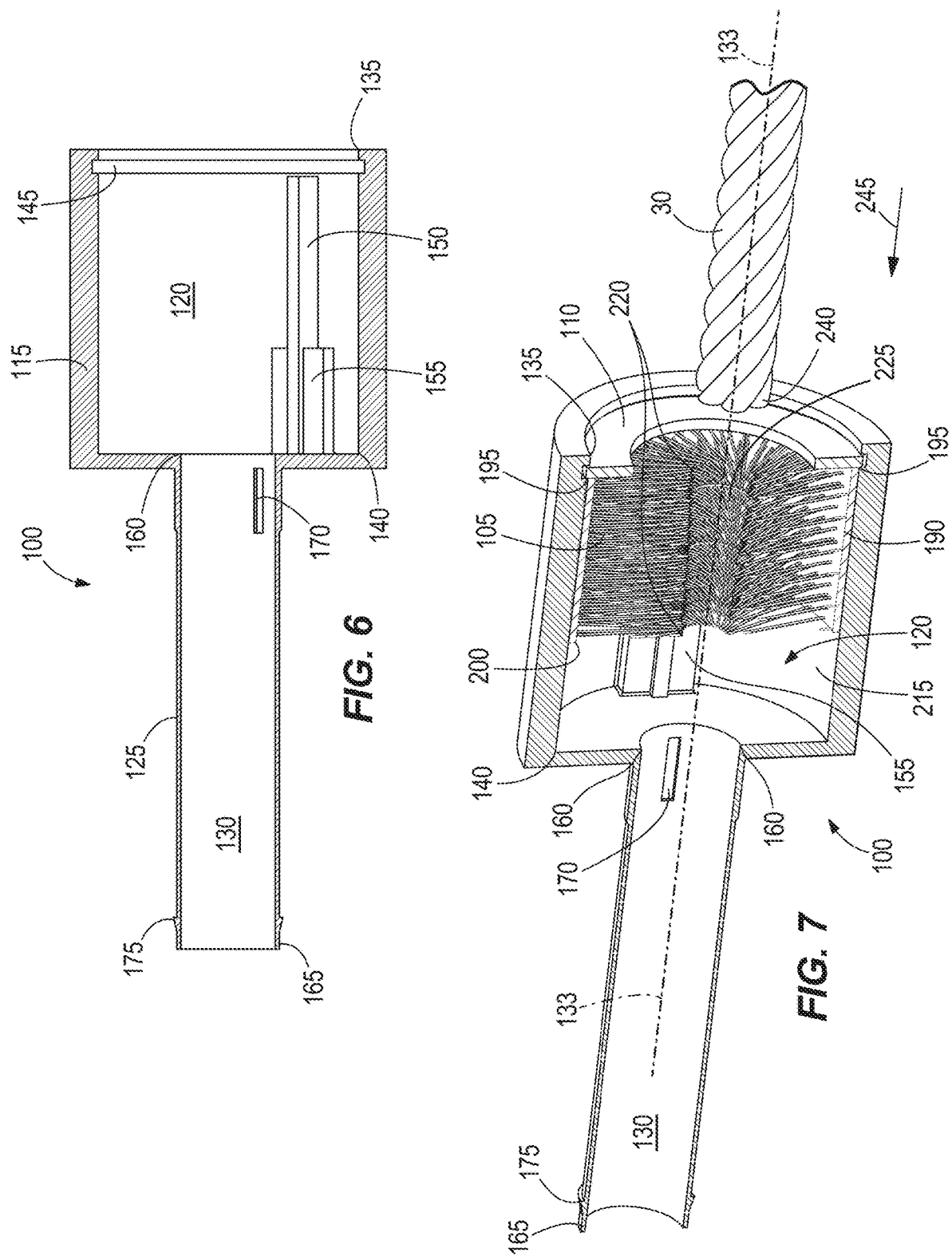

SPLICE ASSEMBLY

CROSS-REFERENCE TO RELATED APPLICATION

This application claims the benefit of prior-filed, U.S. Provisional Patent Application No. 62/355,741, filed Jun. 28, 2016, the entire contents of which are hereby incorporated by reference.

BACKGROUND

The present disclosure relates to connectors for electrical conductors, and particularly to wire splices.

SUMMARY

Wire splices are connectors that are used to join electrical conductors, for example high voltage power lines. Automatic wire splicing connectors allow a user to easily join two different conductors by inserting each conductor into a different end of the wire splice. Wire splicing connectors may be used to quickly connect lengths of suspended cables during installation or repair of electrical lines.

The conductors that are connected by wire splice connectors often have oxidized or dirty outer surfaces. To ensure an effective electrical connection, the conductor must be cleaned. Cleaning may require a dedicated tool and takes time to perform. Cleaning is often not done effectively.

In one embodiment, a brush is configured to engage a conductor and includes a housing and a brush member. The housing includes a first portion and a second portion. The housing defines a housing axis extending between the first portion and the second portion. The first portion defines a cavity having an open end. The second portion defines a bore. A diameter of the cavity is larger than a diameter of the bore. The cavity and the bore are configured to receive the conductor therethrough. The brush member is secured within the cavity and positioned proximate the open end.

In another embodiment, a splice assembly for engaging a conductor includes a splice body having a first end, a second end, and a chamber extending between the first end and the second end. The splice assembly further includes a first jaw and a second jaw disposed within the chamber of the splice body. The first jaw and the second jaw are configured to engage the conductor. The splice assembly further includes a brush coupled to one of the first end and the second end of the splice body. The brush includes a housing including a first portion and a second portion and defines a housing axis extending between the first portion and the second portion. The first portion defines a cavity having an open end. The second portion defines a bore. A diameter of the first portion is larger than a diameter of the second portion. The brush further includes a brush member secured within the cavity proximate the open end. The brush member includes a plurality of bristles extending inwardly toward the housing axis.

In yet another embodiment, a method is provided for coupling a brush to a conductor. The method includes securing a brush member within a first portion of a housing. The brush member includes a plurality of bristles positioned around a portion of a passageway. The bristles extend inwardly toward the passageway. The method further includes inserting the conductor through the passageway from a first end of the housing to a second end of the housing, an end of the conductor extending past the second end of the housing.

Other aspects will become apparent by consideration of the detailed description and accompanying drawings.

BRIEF DESCRIPTION OF THE DRAWINGS

FIG. 4 is a perspective view of a brush.

FIG. 5 is an exploded view of the brush of FIG. 4.

FIG. 6 is a section view of a housing of the brush of FIG. 4.

FIG. 7 is a section view of the brush of FIG. 4 viewed along section 7-7 and aligned with a conductor.

DETAILED DESCRIPTION

Before any embodiments are explained in detail, it is to be understood that the disclosure is not limited in its application to the details of construction and the arrangement of components set forth in the following description or illustrated in the following drawings. The disclosure is capable of other embodiments and of being practiced or of being carried out in various ways. Also, it is to be understood that the phraseology and terminology used herein is for the purpose of description and should not be regarded as limiting. The use of "including," "comprising" or "having" and variations thereof herein is meant to encompass the items listed thereafter and equivalents thereof as well as additional items. The terms "mounted," "connected" and "coupled" are used broadly and encompass both direct and indirect mounting, connecting and coupling. Further, "connected" and "coupled" are not restricted to physical or mechanical connections or couplings, and can include electrical or hydraulic connections or couplings, whether direct or indirect. Also, electronic communications and notifications may be performed using any known means including direct connections, wireless connections, etc.

Figure 1:
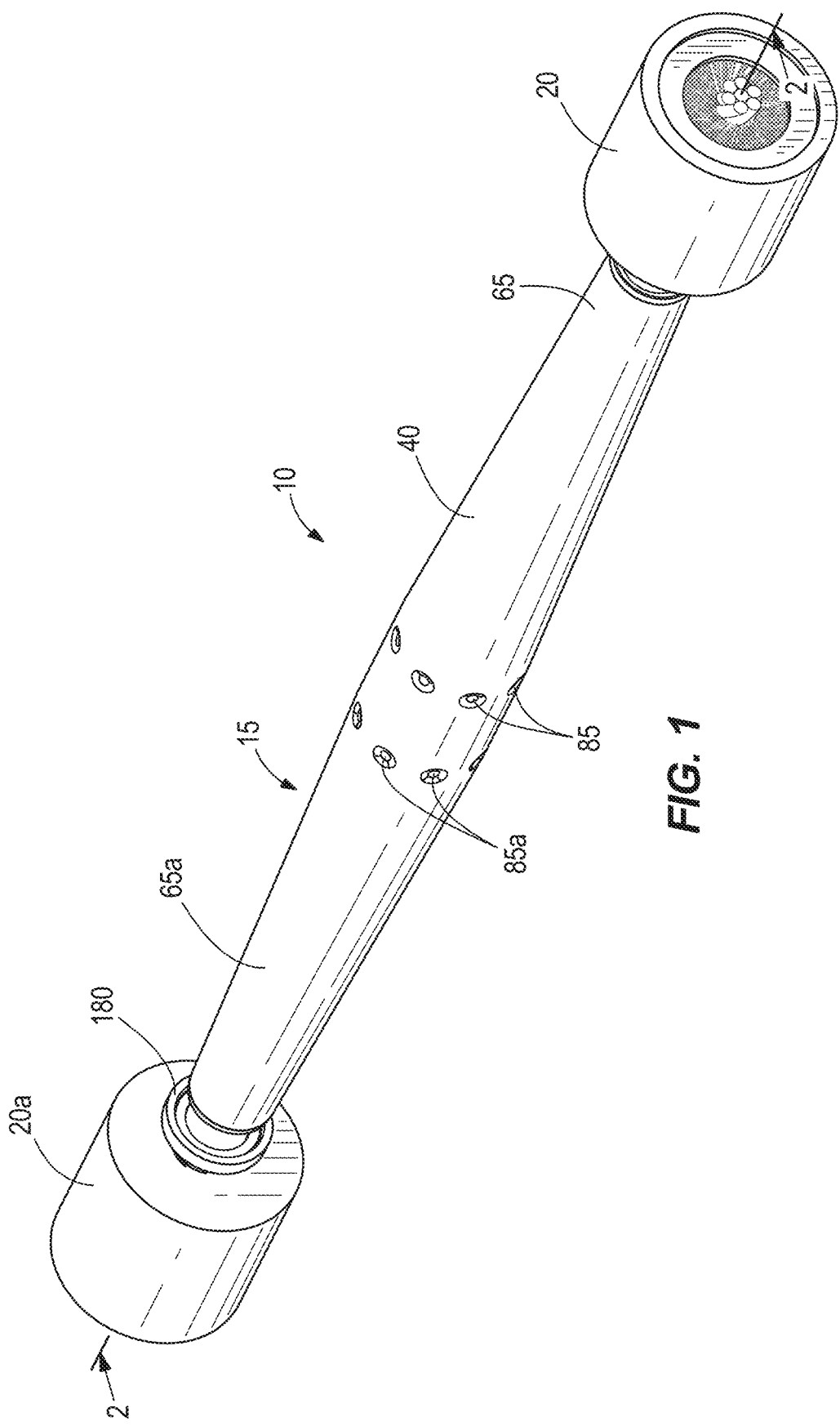
FIG. 1 is a perspective view of a splice assembly.
Figure 2:
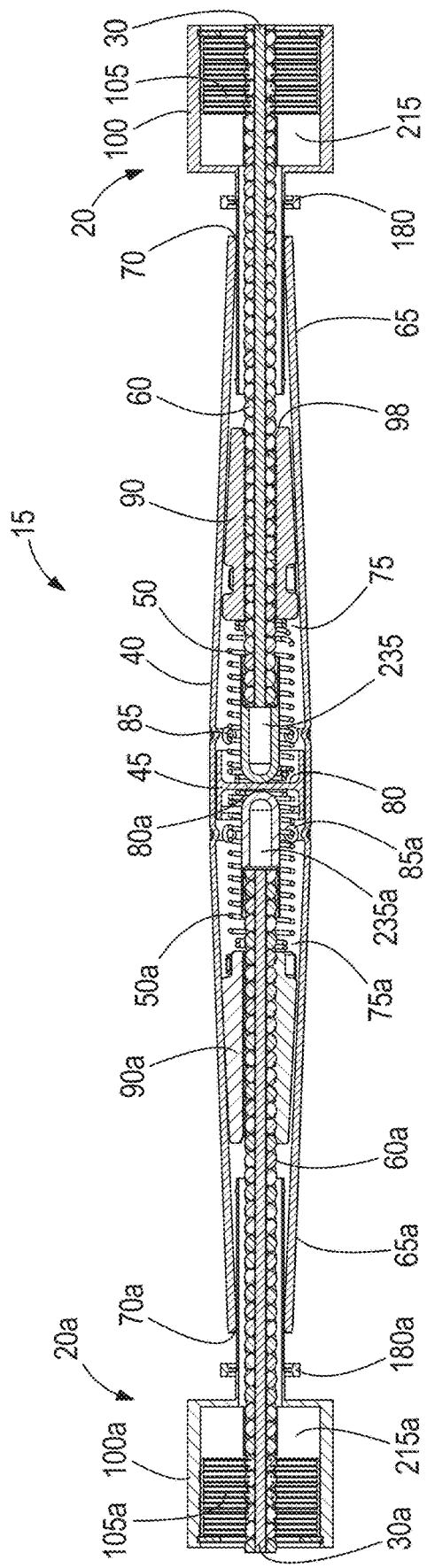
FIG. 2 is a section view of the splice assembly of FIG. 1 viewed along section 2-2.

FIGS. 1 and 2 illustrate a splice assembly 10 for connecting a first conductor 30 and a second conductor 30a (FIG. 2). In the illustrated embodiment, the splice assembly 10 includes a splice body 15, a first brush 20, and a second brush 20a.

As shown in FIG. 2, the splice body 15 includes a housing 40, a divider 45, a first biasing member 50, a second biasing member 50a, a first jaw assembly 55, and a second jaw assembly 55a. The housing 40 is substantially tubular and defines an interior cavity 60. In some embodiments, the housing 40 is made from a conductive material. The housing 40 includes a first tapered end 65 including an opening 70 and a second tapered end 65a including an opening 70a. The openings 70 and 70a communicate with the interior cavity 60. The divider 45 is positioned at a center of the interior cavity 60 to divide the interior cavity 60 into a first chamber 75 and a second chamber 75a.

In the illustrated embodiment, the components in the second chamber 75a are substantially identical to the components in the first chamber 75. Only the components of the first chamber 75 will be discussed in detail for sake of brevity. Like numbering will be used to refer to like parts in the first chamber 75 and the second chamber 75a. The letter "a" will be used to denote parts disposed in the second chamber 75a. Other embodiments, however, may utilize different components in the first chamber 75 and the second chamber 75a.

Figure 3:
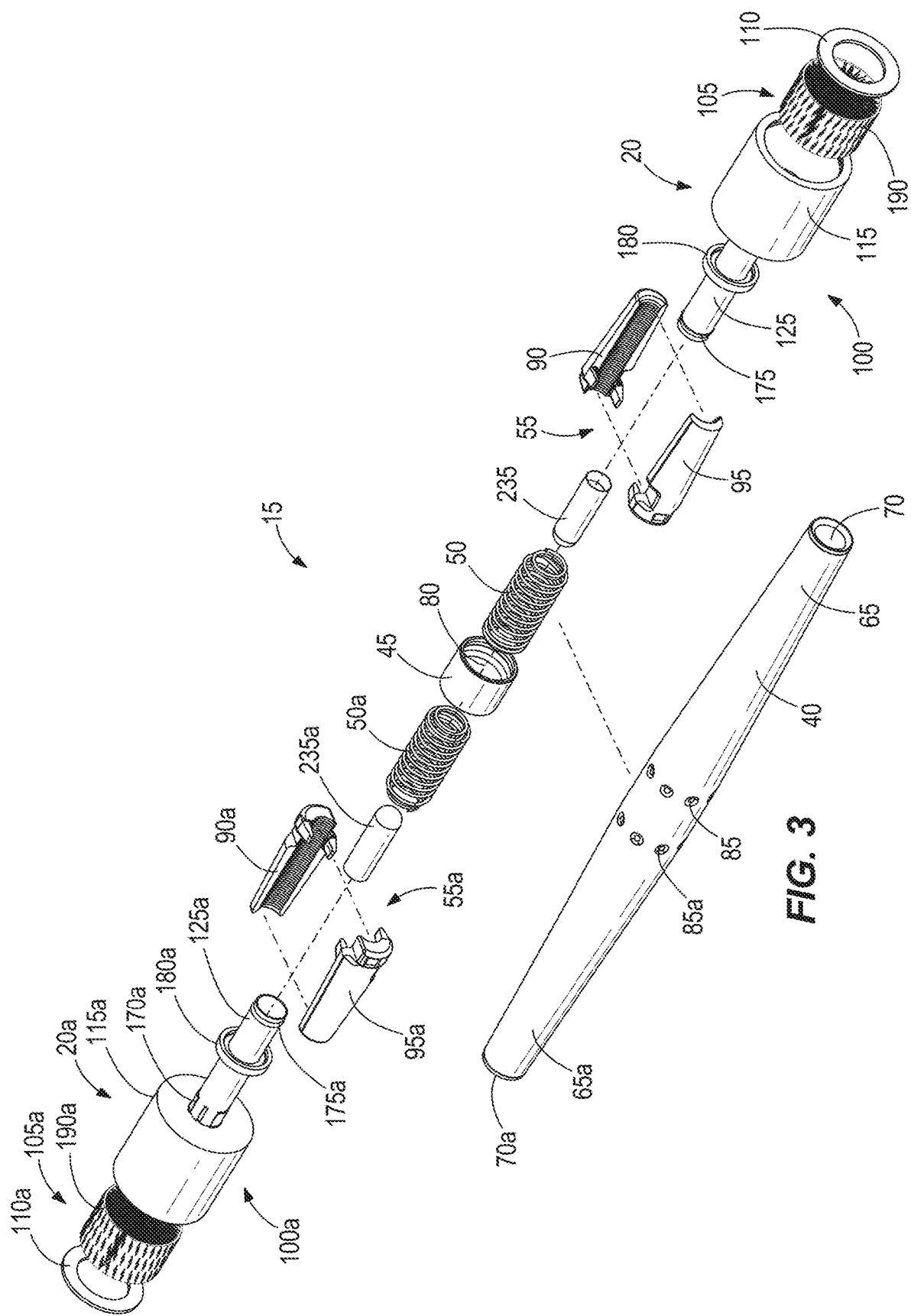
FIG. 3 is an exploded view of the splice assembly of FIG. 1.

As shown in FIGS. 2 and 3, in the illustrated embodiment, the divider 45 has a substantially cylindrical shape. Each side of the divider 45 includes a seat 80, 80a, and each seat 80, 80a engages an end of one of the biasing members 50, 50a, respectively. In the illustrated embodiment, a first plurality of indentations 85 and a second plurality of indentations 85a are formed in the housing 40 to retain the divider 45 relative to the housing 40. In other embodiments, other methods (such as, for example, an adhesive) may be used to secure the divider 45 within the interior cavity 60.

As shown in FIG. 2, the first jaw assembly 55 is disposed within the first chamber 75 proximate an opposite end of the first biasing member 50 from the end that engages the seat 80. In the illustrated embodiment, the first biasing member 50 is a compression spring. The first biasing member 50 urges the first jaw assembly 55 towards the first tapered end 65. The first jaw assembly 55 is shaped to follow a tapered internal profile of the first chamber 75. As shown in FIG. 3, the first jaw assembly 55 includes a first jaw 90 and a second jaw 95. The first jaw 90 and the second jaw 95 have curved inner surfaces that define an opening (FIG. 2) therebetween. In some embodiments, the curved inner surfaces include a plurality of teeth. In some embodiments, the first jaw assembly 55 is made from a conductive material.

As shown in detail in FIGS. 4-6, the brush 20 includes a brush housing 100, a brush member 105, and a cap 110. The brush housing 100 includes a first portion 115 defining a cavity 120 and a second portion 125 defining a central bore 130. The cavity 120 and the central bore 130 are aligned along a longitudinal axis 133 of the brush housing 100. In some embodiments, the brush housing 100 is made from a nonconductive material. The cavity 120 includes a first end 135 and a second end 140. The first end 135 is an open end. A groove 145 is positioned proximate the first end 135 and the cap 110 is secured within the groove 145.

As shown in detail in FIG. 6, an axial distance between the first end 135 and the second end 140 defines a length of the cavity 120. In the illustrated embodiment, a guide ridge 150 is disposed along a portion of the length of the cavity 120. A step 155 extends along a portion of the length of the cavity 120. The step 155 provides a stop surface or a seat for the brush member 105. A length of the guide ridge 150 is larger than a length of the step 155. A width of the step 155 is larger than a width of the guide ridge 150.

Referring again to FIG. 6, the second portion 125 of the brush housing 100 includes a first end 160 and a second end 165. The first end 160 of the second portion 125 is adjacent the second end 140 of the first cavity 120. Apertures 170 extend through a wall of the second portion 125 proximate the first end 160. In some embodiments, the apertures 170 are circumferentially spaced apart from one another about the first end 160. In addition, the second portion 125 includes a flange 175 disposed proximate the second end 165 of the second portion 125. The apertures 170 allow for compression of the second portion 125, allowing the brush housing 100 to fit into splice systems having small inner diameters. In some embodiments, the flange 175 is tapered so that a width of the flange 175 increases in a direction oriented away from the second end 165 of the second portion 125.

Referring again to FIGS. 2 and 3, in some embodiments, an identification ring 180 is coupled to the second portion 125. The identification ring 180 may be integrally formed with the brush housing 100 or may be formed as a separate piece. The identification ring 180 may include markings or may be color or pattern coded to identify the size and type of cables or conductors that extend through the brush housing 100.

As shown in FIG. 5, the brush member 105 includes an outer casing 190, a first end 195, a second end 200, and bristles 205. The outer casing 190 supports the bristles 205. In the illustrated embodiment, a portion of each bristle 205 extends through a hole in the outer casing 190 and is angled to retain the bristle relative to the outer casing 190. In some embodiments, the bristles 205 are integrally formed with the outer casing 190. The outer casing 190 may have a substantially cylindrical shape with a gap 210 extending along a length of the outer casing 190. The outer casing 190 may originally be formed as a strip of material with the bristles 205, and then rolled into a cylindrical shape. In other embodiments, the gap 210 may extend along a portion of the length of the outer casing 190. The gap 210 receives the guide ridge 150 of the first cavity 120 of the brush housing 100, and the second end 200 of the brush member 105 abuts the step 155 disposed within the cavity 120 of the brush housing 100. Stated another way, the brush member 105 is coupled to the brush housing 100 by aligning the gap 210 with the guide ridge 150 and inserting the brush member 105 until the second end 200 contacts the step 155. In the illustrated embodiment, a space 215 (FIG. 8) is formed between the second end 200 of the brush member 105 and the second end 140 of the first cavity 120 of the brush housing 100.

Figure 8:
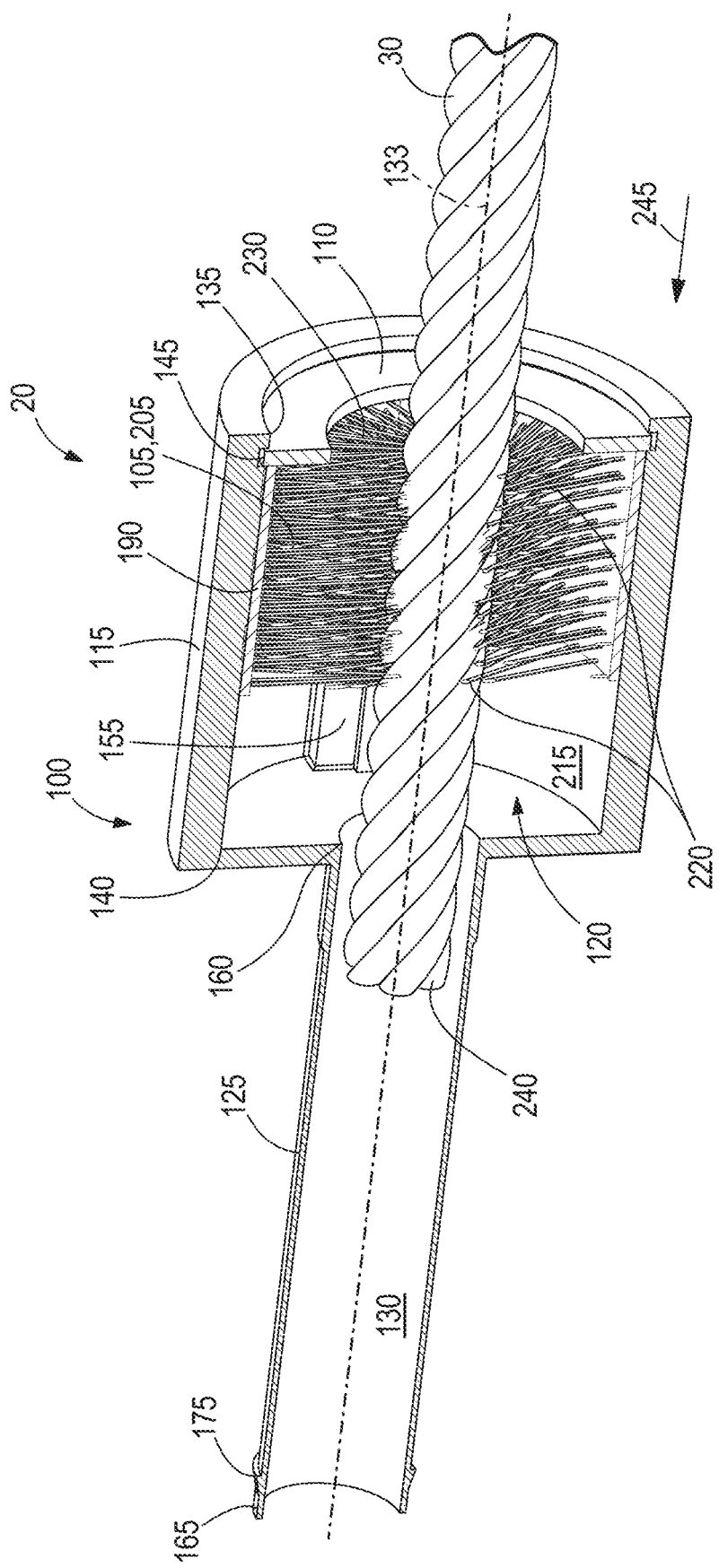
FIG. 8 is a section view of the brush of FIG. 4 engaged with the conductor.

As shown in FIGS. 5 and 8, the outer casing 190 supports the bristles 205. The bristles 205 may have varying lengths. Each bristle includes a distal end 220, and the distal ends 220 are oriented to form a central bore 225. In the embodiment shown in FIG. 8, the lengths of the bristles 205 vary between the first end 195 and the second end 200 of the brush member 105, such that the lengths of the bristles 205 proximate the first end 195 are shorter than the lengths of the bristles 205 proximate the second end 200. The diameter of the central bore 225 is tapered from the first end 195 to the second end 200, such that the diameter is larger proximate the first end 195 than the second end 200. In some embodiments, the diameter of the central bore 225 may be straight. The tapered profile of the central bore 225 allows the brush 20 to effectively clean conductors of various diameters. When the brush member 105 is disposed within the brush housing 100, the central bore 225 of the brush member 105 aligned with the central bore 130 of the brush housing 100 along the longitudinal axis 133. In some embodiments, the brush member 105 is made of a low conductivity metal, such as steel.

As shown in FIG. 5, the cap 110 has a cross-sectional shape similar to a shape of the first portion 115 of the brush housing 100. In the illustrated embodiment, the cap 110 is positioned within the groove 145 of the brush housing 100, securing the brush member 105 within the cavity 120. The cap 110 includes a cap central bore 230. When the cap 110 is engaged with the brush housing 100, the central bore 225 of the cap 110, the central bore 225 of the brush member 105, and the central bore 130 of the brush housing 100 are aligned along the axis 133, defining a through opening extending through the brush 20. In other embodiments, the cap 110 may be integrally formed with the brush housing 100. In still other embodiments, the brush 20 may not include a cap 110, and the outer casing 190 of the brush member 105 may be secured within the cavity 120 by another means, for example by an adhesive.

As shown in FIG. 8, the first brush 20 is inserted into the opening 70 in the first tapered end 65 of the housing 40 of the splice body 15 in a direction shown by the arrow 245. In some embodiments, the identification ring 180 may be positioned on the second portion 125 of the brush housing 100 so that the identification ring 180 is proximate the opening 70 when the first brush 20 is properly positioned within the housing 40 of the splice body 15.

In the illustrated embodiment, a cap 235 (FIG. 2) is attached over a leading end 240 of the first conductor 30 to prevent multiple strands of the first conductor 30 from unraveling as the first conductor 30 is inserted into the first brush 20 and the jaw assembly 55 of the splice system 15. Once the first conductor 30 is aligned with the central bores 130, 225, and 230 of the first brush 20 as shown in FIG. 7, the first conductor 30 is inserted through the cap central bore 230 in the cap 110 of the brush 20 and pushed through the central bore 225 of the brush member 105. As the conductor 30 moves through the central bore 225 of the brush member 105, the first conductor 30 contacts the bristles 205. The bristles 205 deflect towards the second end 140 of the cavity 120 and scrape against an outer surface of the first conductor 30. The bristles 205 proximate the second end 200 of the brush member 105 deflect into the space 215 defined between the second end 200 of the brush member 105 and the second end 140 of the cavity 120 of the brush housing 100. The first conductor 30 is inserted through the central bore 130 defined by the second portion 125 of the brush housing 100 (FIG. 8) so that the leading end 240 of the first conductor 30 protrudes from the second portion 125 of the brush housing 100 and is positioned proximate the jaw assembly 55 of the splice system.

After inserting the first conductor 30 though the first brush 20, the cap 235 or the leading end 240 of the first conductor 30 contacts the central opening 98 of the jaw assembly 55 and pushes the jaw assembly 55 against the force of the biasing member 50 in the direction shown by the arrow 245. As the jaw assembly 55 is pushed in the direction shown by the arrow 245, a diameter of the tapered end 65 increases and the leading end 240 of the first conductor 30 slides into the central opening 98 between the first jaw 90 and the second jaw 95, splaying the first jaw 90 and the second jaw 95 apart. In some embodiments, the first conductor 30 is pushed further into the interior cavity 60 of the splice housing 40 until the cap 235 contacts the seat 80 of the central divider 45.

Once the first conductor 30 has been fully inserted into the first brush 20, the user releases the first conductor 30, removing the force that overcomes the force exerted by the biasing member 50. The biasing member 50 urges the jaw assembly 55 in a direction opposite the direction shown by the arrow 245 such that the jaws 90, 95 are pushed against the tapered end 65 of the housing 40 of the splice body 15 and clamp together around the first conductor 30. As the jaws 90, 95 are urged against the tapered end of the housing 40 of the splice body, the first brush 20 is urged outward. The outward movement of the first brush 20 is an indication that the first conductor 30 has been successfully inserted into the splice system 15. The jaws 90, 95 therefore secure the first conductor 30 in the opening 98. The flange 175 is secured between the jaws 90, 95, which ensures that the first brush 20 remains engaged with the splice body 15 and does not slide axially along the first conductor 30 after the first brush 20 has been inserted into the splice system 15.

After installing the first conductor 30, the second brush 20a is inserted into the opening 70a of the second tapered end 65a of the housing 40 of the splice body 15. Once the second conductor 30a is aligned with the central bores 130a, 225a, and 230a in the second brush 20a, the second conductor 30a is inserted through the second brush 20a as described above with respect to the first conductor 30. The second conductor 30a is therefore secured in the central opening 98a of the jaw assembly 55a disposed in the second tapered end 65a of the housing 40 of the splice body 15.

Alternatively, the user may insert the conductor 30, 30a into the brush 20, 20a before inserting the brush 20, 20a into the splice assembly 10.

After both the first conductor 30 and the second conductor 30a have been attached to the splice body 15, the first conductor 30 and the second conductor 30a are in electrical communication with one another. For example, electrical current may flow from the first conductor 30 to the first jaw assembly 55, then to the housing 40, to the second jaw assembly 55a, and then to the second conductor 30a. Alternatively, current may flow from the second conductor 30a to the first conductor 30. For example, the current may flow from the second conductor 30a to the second jaw assembly 55a, to the housing 40, to the first jaw assembly 55, to the first conductor 30.

Although some aspects have been described in detail with reference to certain preferred embodiments, variations and modifications exist within the scope and spirit of one or more independent aspects as described. Various features and advantages are set forth in the following claims.

What is claimed is:

1. A splice assembly for engaging a conductor, the splice assembly comprising:
   a splice body including a first end, a second end, and a chamber extending between the first end and the second end;
   a first jaw and a second jaw disposed within the chamber of the splice body, the first jaw and the second jaw configured to engage the conductor;
   a brush coupled to one of the first end and the second end of the splice body, the brush including,
      a housing including a first portion and a second portion and defining a housing axis extending between the first portion and the second portion, the first portion defining a cavity having a first, open end and a second end spaced apart from the first end, the second portion defining a bore, and a diameter of the first portion being larger than a diameter of the second portion; and
      a brush member secured within the cavity proximate the first end and spaced apart from the second end, the brush member including a plurality of bristles extending inwardly toward the housing axis.

2. The splice assembly of claim 1, further comprising a biasing member, the biasing member configured to urge the first jaw and the second jaw towards one of the first end or the second end of the splice body.

3. The splice assembly of claim 1, wherein the splice body and the first and second jaws are made of a conductive material.

4. The splice assembly of claim 1, wherein the housing of the brush is made of a non-conductive material.

5. The splice assembly of claim 1, wherein the bore of the second portion of the housing, the bore of the housing, and the chamber of the splice body are configured to receive the conductor therethrough.

6. The splice assembly of claim 1, wherein the second portion of the housing is disposed within the chamber of the splice body.

7. The splice assembly of claim 1, wherein the housing further includes a step extending from the second end of the cavity towards the first end of the cavity.

8. The splice assembly of claim 7, wherein the step includes a guide portion extending towards the first end of the cavity, and wherein the brush member includes an outer wall, the outer wall including a gap receiving the guide portion.

9. The splice assembly of claim 7, wherein the housing includes a first end and a second end, the second end of the brush member abutting the step.

10. The splice assembly of claim 1, wherein the cavity includes a groove proximate the first end, the brush further including a cup cap at least partially received within the groove.

11. The splice assembly of claim 1, wherein the second portion includes an aperture extending through a wall that defines the bore.

12. The splice assembly of claim 1, wherein the second portion includes a flange extending from a wall that defines the bore.

13. The splice assembly of claim 1, wherein the second portion includes an identification ring.

14. A splice assembly for engaging a conductor, the splice assembly comprising:
   a splice body including a first end, a second end, and a chamber extending between the first end and the second end;
   a first jaw and a second jaw disposed within the chamber of the splice body, the first jaw and the second jaw configured to engage the conductor;
   a brush coupled to one of the first end and the second end of the splice body, the brush including,
      a housing including a first portion and a second portion and defining a housing axis extending between the first portion and the second portion, the first portion defining a cavity having an open end, the second portion defining a bore, and a diameter of the first portion being larger than a diameter of the second portion; and
      a brush member secured within the cavity proximate the open end, the brush member including a plurality of bristles extending inwardly toward the housing axis,
   wherein the cavity of the housing includes a second end spaced apart from the open end, the housing further including a step extending from the second end of the cavity towards the open end of the cavity, and
   wherein the step includes a guide portion extending towards the first end of the cavity, and wherein the brush member includes an outer wall, the outer wall including a gap receiving the guide portion.

15. A splice assembly for engaging a conductor, the splice assembly comprising:
   a splice body including a first end, a second end, and a chamber extending between the first end and the second end;
   a first jaw and a second jaw disposed within the chamber of the splice body, the first jaw and the second jaw configured to engage the conductor;
   a brush coupled to one of the first end and the second end of the splice body, the brush including,
      a housing including a first portion and a second portion and defining a housing axis extending between the first portion and the second portion, the first portion defining a cavity having an open end, the second portion defining a bore, and a diameter of the first portion being larger than a diameter of the second portion; and
      a brush member secured within the cavity proximate the open end, the brush member including a plurality of bristles extending inwardly toward the housing axis,
   wherein the cavity of the housing includes a second end spaced apart from the open end, the housing further including a step extending from the second end of the cavity towards the open end of the cavity, and
   wherein the housing includes a first end and a second end, the second end of the brush member abutting the step and spaced from the second end of the cavity.

* * * * *